United States Patent

Vergnolle

[15] 3,705,366

[45] Dec. 5, 1972

[54] TWO-TERMINAL REACTIVE HYBRID MICROCIRCUIT HAVING CAPACITIVE DIODE TERMINATION

[72] Inventor: Claude Vergnolle, Limours, France

[73] Assignee: Thomson-CSF, Paris, France

[22] Filed: Dec. 14, 1970

[21] Appl. No.: 97,750

[30] Foreign Application Priority Data

Dec. 16, 1969 France....................................6943511

[52] U.S. Cl. .............333/31 R, 325/446, 329/205 R, 332/52, 333/70 S, 333/73 S

[51] Int. Cl. ................................................H01p 1/18

[58] Field of Search....333/7, 31 R, 73 R, 73 C, 73 S, 333/70 S; 329/162, 205 R; 325/446, 449; 332/52

[56] References Cited

UNITED STATES PATENTS

| | | | |
|---|---|---|---|
| 3,503,015 | 3/1970 | Coraccio et al. | 333/73 R X |
| 3,573,660 | 4/1971 | Garver | 325/446 X |
| 3,246,265 | 4/1966 | Smith-Vaniz | 333/31 R |
| 3,546,636 | 12/1970 | Di Piazza | 333/31 |
| 3,423,699 | 1/1969 | Hines | 333/31 R |
| 3,453,564 | 7/1969 | Russell | 333/73 R X |
| 3,454,906 | 7/1969 | Hyltin et al. | 333/31 R |

*Primary Examiner*—Paul L. Gensler
*Attorney*—Karl F. Ross

[57] ABSTRACT

A phase shifter, detector and/or modulator for super-high-frequency waves includes a two-terminal reactance network whose inductive branches consist of short linear conductors, measuring a small fraction of the free-space wavelength of an oscillation to be controlled, and whose capacitive branch or branches are lumped condensers; the network is terminated in a diode, with or without a large-capacitance series condenser, which can be selectively blocked or unblocked by the application of a suitable biasing potential to vary its impedance between a very high and a very low value. The components of the network are mounted on a conductive block received in a cutout of a two-conductor or three-conductor line strip.

7 Claims, 10 Drawing Figures

Claude Vergnolle
INVENTOR.

BY

Karl F. Ross
Attorney

Claude Vergnolle
INVENTOR.

BY

Karl F. Ross
Attorney

Claude Vergnolle
INVENTOR.

BY

Karl F. Ross
Attorney

TWO-TERMINAL REACTIVE HYBRID MICROCIRCUIT HAVING CAPACITIVE DIODE TERMINATION

My present invention relates to a microcircuit assembly for controlling waves of high frequency, particularly those in the gigacycle range.

The general object of this invention is to provide a compact unit that can be used over a wide range of ultrahigh and/or superhigh frequencies, to invert (i.e. to shift in phase by 180°), detect or modulate a locally generated or incoming carrier wave.

More specifically, it is an object of my invention to provide a unit of this description consisting entirely of passive circuit elements.

Such a unit, in accordance with the present invention, includes a microcircuit of the hybrid type, i.e. an assembly of impedance elements of reduced dimensions consisting partly of linear conductors with distributed inductance and partly of condenser and diode structures which constitute lumped capacitances and are preferably in the form of small buttons or disks not encapsulated in any housing or cartridge. The absence of such housings eliminates stray shunt capacitances and inductances, thereby simplifying the determination of the circuit constants.

In accordance with this invention, I provide a two-terminal reactive network with input connections to a source of oscillations to be controlled, such as a local oscillator, this network having an inductive series arm and a capacitive shunt arm of the character described above (i.e. with distributed inductance and lumped capacitance) while being terminated in an impedance consisting at least in part of a diode adapted to be selectively blocked or unblocked by the application of a suitable biasing voltage. In its blocked state, this diode constitutes a very high impedance which could be theoretically infinite but which, at the high frequencies here considered, has a significant capacitance on the order of magnitude of the capacitance of the shunt condenser; upon the unblocking of the diode, this impedance becomes negligible.

Thus, a switching of the biasing potential causes a shift by almost 180° in the relative phase of the incident and reflected waves at relatively low carrier frequencies, this phase shift decreasing for higher carrier frequencies at which, however, the physical length of the series arm introduces a compensating change in phase angle if this length is suitably chosen as a small fraction of the free-space wavelength of the carrier frequency. If the distributed capacitance of the series arm with reference to the usually grounded other input terminal of the network is negligible compared with the lumped capacitances of the shunt condenser and the terminal diode, the change in the phase angle of the reflected wave as a function of frequency (with a fixed terminal impedance) is smaller than with an ordinary two-conductor transmission line. It thus becomes possible to design a reactance network of the aforedescribed type, more specifically a T section, in such a way that a combination of the reflected wave with the input wave yields two substantially opposite vectors, in response to the selective application of a biasing potential, preserving their 180° phase relationship over an extended range up to, say, 10GHz with a maximum deviation of not more than 5 percent, e.g. for the purpose of energizing a sweep circuit for an antenna array of a radar transmitter as described, for example, in commonly owned U.S. Pat. No. 3,448,450.

The bias applied to the terminal diode may also be so chosen as to clip half of the cycles of a modulated carrier, the system thereby serving as a detector for the modulating signal. Alternatively, such a modulating signal may be fed into the biasing lead so that the system will operate as a modulator or mixer.

The above and other features of my invention will be described in detail hereinafter with reference to the accompanying drawing in which.

Figure 1:
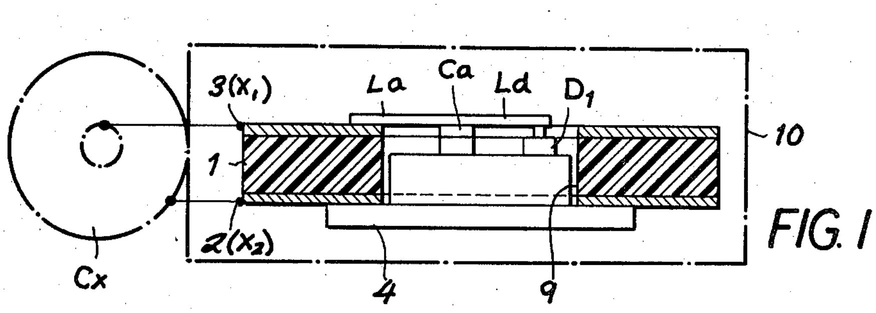
FIG. 1 is a cross-sectional view of a panel or line of the microstrip type forming part of a microcircuit according to the invention.

In FIG. 1 I have shown at 1 a panel or line of the microstrip type with a grounded metallic bottom layer 2 and a similar top layer 3 respectively connected to the outer sheath and the inner core of a coaxial cable C*x* serving to impress upon these conductors the high-frequency output of a local oscillator, not further illustrated. The dielectric panel body 1 has a cutout 9 plugged at the bottom by a metal block 4, acting as a grounded base, with a peripheral flange soldered, brazed or otherwise conductively secured to the bottom layer 2. The top of block 4 carries a pair of button-shaped impedance elements rising to the level of layer 3, i .e. a condenser C*a* and a diode $D_1$. Condenser C*a* may be, for example, of the ceramic or of the MOS (metal-oxide/semiconductor) type and has an ungrounded terminal tied to an intermediate point of a linear conductor, i.e. a ribbon or a wire, galvanically connected to layer 3 and overhanging the gap 9, thereby dividing this conductor into a pair of portions L*a* and L*d* acting as distributed inductances at the high frequencies involved. Portion L*a*, bridging layer 3 and condenser C*a*, is somewhat shorter than section Ld which terminates at the ungrounded terminal of diode $D_1$. The latter could be of a type particularly designed for microwaves, e.g. of the Schottky or the snap-off variety, a varactor, or a semiconductor with a P and an N layer separated by an indifferent I layer of intrinsic semiconductor material (e.g. silicon). The supply line 1 – 3 may have a characteristic impedance of 50 ohms. It will be noted that the lower part of base 4 bridges the discontinuity in layer 2 formed by the cutout 9.

Figure 2:
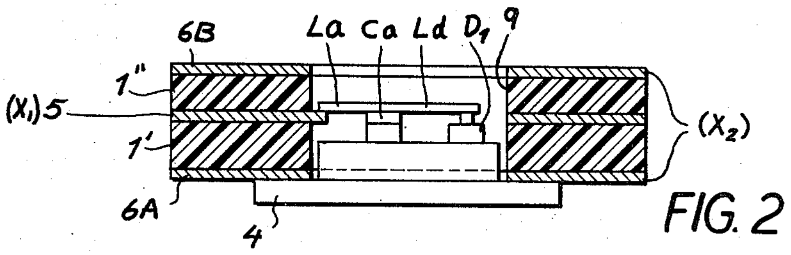
FIG. 2 is a view similar to FIG. 1 illustrating a modified strip line.

An equivalent alternate arrangement is shown in FIG. 2 where a live conductor layer 5 is sandwiched between two dielectric strip portions 1′ and 1″ whose outer surfaces are covered by a pair of grounded layers 6A, 6B. In this instance, conductor L*a*, L*d* lies at the intermediate level of layer 5 so that the assembly in cutout 9 is better protected, both mechanically and electromagnetically, by the surrounding panel body. Either unit may be placed in a sealed enclosure 10 illustrated schematically in FIG. 1.

Figure 3:
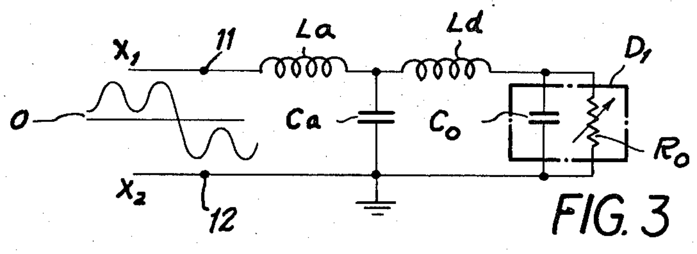
FIG. 3 is a diagram representing the equivalent circuit of the structure of FIG. 1 or 2.

FIG. 3 shows the equivalent circuit in which conductor portions L*a* and L*d* have been illustrated as impedances constituting the series arm of a reactive T section, with a pair of input terminals 11, 12, having its shunt arm represented by condenser C*a*. The input terminals of this network, which is terminated by the diode $D_1$, are connected to respective leads $X_1$, $X_2$ of a supply line, lead $X_1$ corresponding to layers 3 and 5 in FIGS. 1 and 2 whereas lead $X_2$ is embodied in layer 2 and layers 6A, 6B, respectively. The impressed local oscillation O, as shown, is assumed to be superimposed upon a d-c biasing potential of either polarity blocking or unblocking the diode $D_1$ so that the terminal impedance of the network, as seen from the line $X_1$, $X_2$, is either very high or very low. This diode may therefore be represented by a resistance $R_o$ of variable magnitude, alternating between near-zero and near-infinity, and a virtual capacitance $C_o$ in parallel therewith. The desired bias may also be applied to diode $D_1$ in other ways, e.g. as described hereinafter with reference to FIGS. 5, 6 and 8 – 10.

Network L*a*, L*d*, C*a*, having the configuration of a low-pass filter, has a physical dimension (the length of its series arm L*a*, L*d*) which is a small fraction of the free-space wavelength of oscillation O. Any change in the frequency of this oscillation shifts the nodes and lobes of the standing waves generated by reflection in the input line $X_1$, $X_2$, yet this shift is somewhat smaller than it would be if the network were replaced by a comparable two-conductor transmission line with distributed capacitance. Thus, with proper dimensioning of the conductor portions L*a*, L*d* and of the capacitance of condenser C*a*, the effect of the capacitive termination of the network by diode $D_1$ upon the phase shift resulting from the alternate blocking and unblocking of this diode can be substantially compensated to produce a reasonably flat response characteristic, similar to a Tchebicheff curve, up to frequencies equal to or even above 10 GHz.

Figure 4:
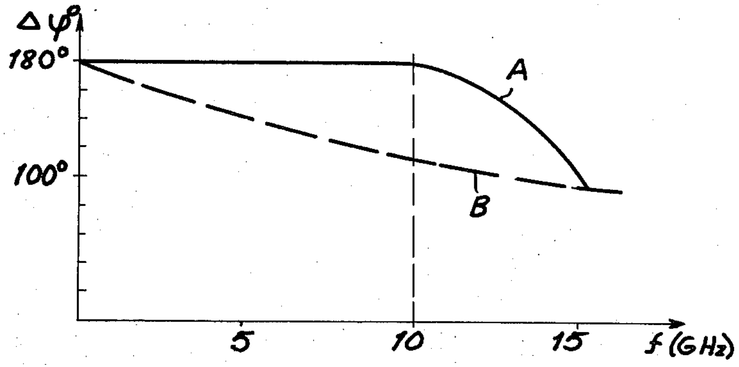
FIG. 4 is a graph relating to the operation of the system of FIG. 3.

By way of specific example, the capacitance $C_o$ of diode $D_1$ may be equal to 0.2 pF, the inductances of conductor portions L*a* and L*d* may be 0.22 nH and 0.9 nH, respectively, and the capacitance of condenser C*a* may be 0.25 pF. The performance of such a system has been illustrated in FIG. 4 where the solid curve A represents the phase shift $\Delta\phi$ on switchover, this phase shift remaining substantially constant at about 180° up to 10 GHz. By way of comparison, another curve B (dotted lines) represents the shift angle $\Delta\phi$ for an ordinary transmission line with omission of elements L*a*, L*d* and C*a*, this angle dropping to about 120° at the range limit of 10 GHz.

In certain practical realizations of the embodiment of FIG. 3, the microstrip 1′, 1″ consisted or aluminum oxide, diode $D_1$ was of the PIN variety (with intermediate layer I), condenser Ca was of the MOS type, and the elements Ca and $D_1$ was soldered onto the block 4 by means of gold-silicon or gold-germanium alloys; the block consisted of gold-plated copper or a similarly plated nickel-cobalt-iron alloy known as Kovar. The diode and the condenser had a height of 0.15 mm, the length of conductor portions L*a* and L*d* was 0.7 mm and 217 mm, respectively, and the width of the ribbon L*a*, L*d* was 0.18 mm.

Figure 5:
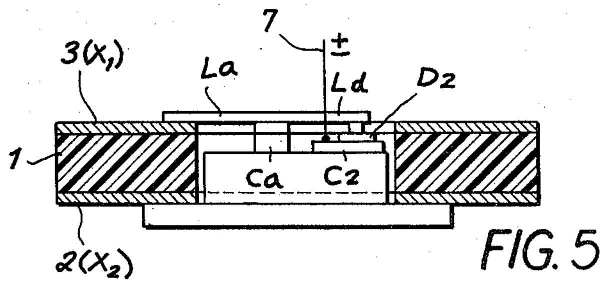
FIG 5 is another view similar to FIG. 1, showing a further modification.
Figure 6:
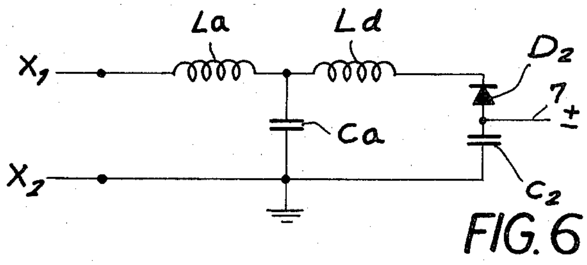
FIG. 6 is a diagram representing the equivalent circuit of the system of FIG. 5.

As shown in FIG. 5, the termination of the network may be modified by replacement of the diode $D_1$ of FIGS. 1 and 2 with a series combination of a similar diode $D_2$ and a coupling condenser $C_2$. As shown in FIG. 5 and also in the equivalent circuit of FIG. 6, a lead 7 connected to the junction of diode $D_2$ with condenser $C_2$ may be used to bias this diode on or off. Provided that the capacitance of condenser $C_2$ is large compared with the effective capacitance $C_o$ of the diode, the system of FIGS. 5 and 6 will operate essentially in the same manner as that of FIGS. 1 – 3.

If the potential applied to lead 7 corresponds to the midpoint of the voltage swing on conductor $X_1$, the system will operate as a reflex detector rather than as a phase shifter. It is also possible to feed a lower-frequency signal into the network by way of lead 7 whereupon the system will operate as a mixer for modulating (or demodulating) the incoming carrier frequency with, say, an intermediate frequency; for this type of use it is advantageous to employ a tunnel diode or a Schottky diode as the element $D_2$. Such modulation or detection can, however, also be carried out with a network as shown in FIGS. 1 and 2 (i.e. with omission of coupling condenser $C_2$) if the proper bias or the modulating/demodulating signal is fed in through the input line $X_1$, $X_2$.

Figure 7:
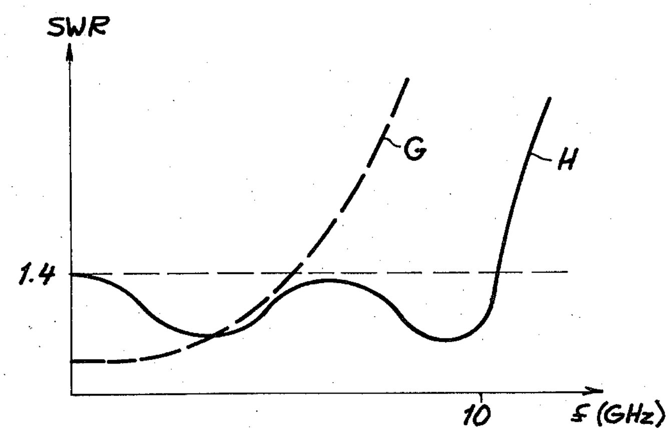
FIG. 7 is a graph relating to the operation of FIG. 6.

The significance of the insertion of network L*a*, L*d*, Ca between the input line and the switchable diode is further illustrated in FIG. 7 which shows at G (dotted lines) the standing-wave ratio (SWR) as a function of frequency *f* in the absence of this network, the corresponding function with the network included being indicated by a curve H (solid line). It will be noted that the magnitude SWR rises parabolically in the first instance, intersecting the 1.4 level well below the range limit of 10 GHz, whereas the curve H remains below that level from the lowest frequencies up to almost 12 GHz.

The network L*a*, L*d*, C*a* could also be energized directly from a coaxial cable such as the one shown in FIG. 1, without interposition of a strip line, e.g. by way of a large-capacitance input condenser inserted between the series arm of the network and the central conductor of the cable.

Figure 8:
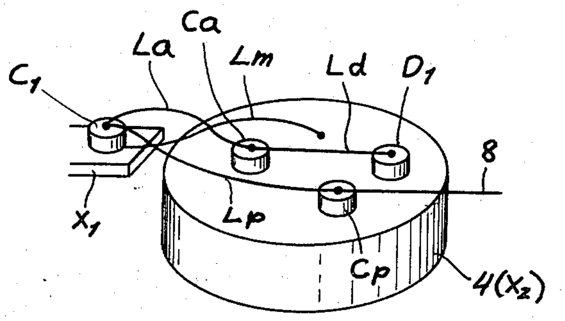
FIG. 8 is a perspective view of part of an assembly representing a further embodiment.
Figure 9:
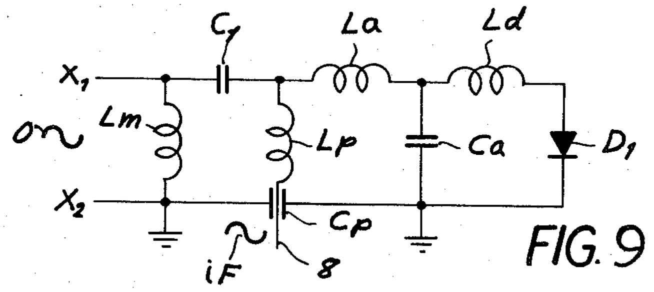
FIG. 9 is a diagram showing the equivalent circuit of the structure of FIG. 8.
Figure 10:
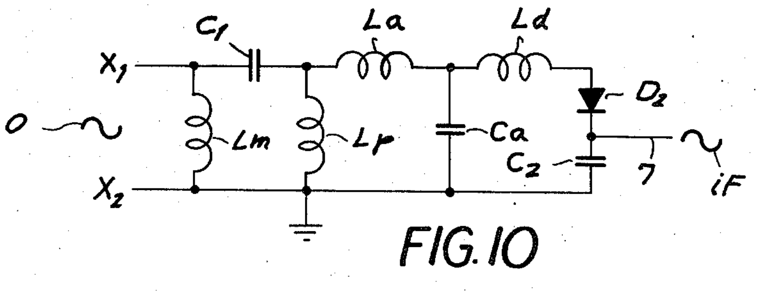
FIG. 10 is a diagram similar to FIG. 9, showing a modification of that system.

FIGS. 8 – 10 illustrate a further refinement in which such an input condenser $C_1$ is interposed between the live conductor $X_1$ and the energizing lead L*a* of condenser C*a*. A bypass condenser C*p*, mounted directly on block 4, has its ungrounded terminal connected to the corresponding terminal of condenser $C_1$ via a wire L*p* serving as an inductive link therebetween. A similar wire Lm bridges the conductor $X_1$ and the block 4. The equivalent circuit of the system, which is otherwise identical with that of FIG. 1 or 2, is shown in FIG. 9 where the leads L*m* and L*p* have been represented as shunt inductances of an additional network section, of $\pi$ configuration, whose series arm is constituted by the condenser $C_1$ and which therefore operates as a high-pass filter. A lead 8, connected to lead $Lp$ at the live terminal of condenser $Cp$ and therefore separated by this condenser from ground, serves for the introduction of an intermediate-frequency signal IF to modulate the high-frequency input oscillation O, as described above with reference to lead 7 of FIGS. 5 and 6, or to receive a continous or alternating d-c potential for biasing the diode $D_1$ as a detector or as a switchable terminating impedance.

Again, as illustrated in FIG. 10, terminal diode $D_1$ may be replaced by a diode $D_2$ in series with a coupling condenser $C_2$, their junction being connected to a lead 7 through which the modulating, switching or biasing voltage can be applied. In either case, the high-pass filter constituted by network section $Lm$, $Lp$, $C_1$ effectively separates this control signal from the input line supplying the high-frequency oscillation O.

In the modification of FIG. 10, the bypass condenser $Cp$ has been omitted with lead $Lp$ soldered or otherwise galvanically joined directly to block 4. If desired, however, the features of both circuits may be combined to make available two alternate control inputs 7 and 8, e.g. for the purpose of applying biasing voltages of opposite polarities to the diode.

The common metal block 4 may serve as a carrier for two such circuits constituting, for example, a balanced mixer with control leads 7 and/or 8 energized in push-pull from a common coupler.

It will thus be seen that I have provided a compact and versatile control circuit operating effectively over a wide frequency band in the microwave range to perform functions which with conventional circuitry could be carried out over hardly more than an octave. Essentially, the range limits of this improved system are determined only by the inherent properties of its constituents, especially of its lumped circuit elements such as the button-type condenser $Ca$ and diode $D_1$ or $D_2$.

The reflex phase shifter here disclosed may work into a linear phase shifter, e.g. as described in commonly owned application Ser. No. 98,077 filed on even date herewith by Ronald Funck, which supplies the input oscillations to conductors 2, 3 (or 5, 6A, 6B) via a transmission line of the same microstrip type subdivided into several line segments by longitudinally spaced branch points forming junctions with respective shunt paths whose effective impedances may be varied by the selective biasing of similar types of diodes in series with respective blocking condensers, the biasing potentials thus determining the insertion of any desired number of incremental phase shifts into the line.

I claim:

1. A microcircuit assembly for controlling high-frequency waves, comprising:

a reactive two-terminal network provided with a pair of input terminals, said network including a linear conductor having one end connected to one of said input terminals, a grounded base connected to the other of said input terminals and a shunt condenser connected between said base and an intermediate point of said conductor, said intermediate point dividing said conductor into two portions which define respective inductive series arms of a T section having a capacitive shunt arm constituted by said condenser;

a terminal impedance for said T section connected between said base and the other end of said conductor, said impedance including a diode having a capacitance on the order of that of said condenser;

circuit means including a strip line and an input condenser on said strip line for connecting said input terminals across a source of high-frequency oscillation, said circuit means comprising a strip line with at least two parallel conductive layers separated by insulation, one of said layers being coupled by way of said input condenser to said conductor at said one of said input terminals, the other of said layers being galvanically joined to said base at said terminals;

a further linear conductor connecting said one of said layers to said base, said further conductor having a significant inductance at the frequency of said oscillations; and biasing means connected to said terminal impedance for varying the ability of said diode to pass said oscillations.

2. A microcircuit assembly as defined in claim 1 wherein said linear conductor has a physical length substantially shorter than the free-space wavelength of said oscillations.

3. A microcircuit assembly as defined in claim 1 wherein said terminal impedance includes a capacitor in series with said diode, said biasing means including a lead connected to the junction of said diode with said capacitor, the latter having a capacitance substantially greater than that of said condenser.

4. A microcircuit assembly as defined in claim 1 wherein said strip line is provided with a cutout forming a discontinuity in said layers and in said insulation, said base bridging the discontinuity of said other of said layers and forming a metallic block within said cutout, said condenser and said diode being supported on said block within said cutout.

5. A microcircuit assembly as defined in claim 1, further comprising a predominantly inductive link between said input condenser and said base, said inductive link and said further conductor defining with said input condenser a high-pass filter for said oscillations.

6. A microcircuit assembly as defined in claim 5 wherein said inductive link includes an additional condenser mounted on said base.

7. A microcircuit assembly as defined in claim 6 wherein said biasing means includes a lead connected to a terminal of said additional condenser remote from said base.

* * * * *